United States Patent
Fukami et al.

(10) Patent No.: US 8,968,139 B2
(45) Date of Patent: Mar. 3, 2015

(54) REDUCTION DIFFERENTIAL GEAR APPARATUS FOR ELECTRIC VEHICLE

(75) Inventors: Rino Fukami, Iwata (JP); Katsufumi Abe, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/118,717

(22) PCT Filed: Apr. 6, 2012

(86) PCT No.: PCT/JP2012/059525
§ 371 (c)(1),
(2), (4) Date: Feb. 4, 2014

(87) PCT Pub. No.: WO2012/160887
PCT Pub. Date: Nov. 29, 2012

(65) Prior Publication Data
US 2014/0141918 A1   May 22, 2014

(30) Foreign Application Priority Data

May 20, 2011   (JP) .................................. 2011-113364

(51) Int. Cl.
*F16H 48/10* (2012.01)
*B60K 1/00* (2006.01)
(Continued)

(52) U.S. Cl.
CPC *F16H 48/10* (2013.01); *B60K 1/00* (2013.01); *B60K 17/165* (2013.01); *F16H 48/11* (2013.01); *B60K 2001/001* (2013.01); *F16H 2200/0021* (2013.01)
USPC ........................................................ 475/150

(58) Field of Classification Search
CPC ...... B60K 6/365; B60K 6/445; B60K 17/046; F16H 2048/343
See application file for complete search history.

(56) References Cited

U.S. PATENT DOCUMENTS

| 6,074,321 A | 6/2000 | Maeda et al. |
| 6,329,731 B1 | 12/2001 | Arbanas et al. |
| 6,499,549 B2 * | 12/2002 | Mizon et al. ................. 180/65.6 |

FOREIGN PATENT DOCUMENTS

| JP | 48-87477 | 10/1973 |
| JP | 57-12149 | 1/1982 |

(Continued)

OTHER PUBLICATIONS

International Search Report issued Jun. 5, 2012 in International (PCT) Application No. PCT/JP2012/059525.

(Continued)

*Primary Examiner* — Robert A Siconolfi
*Assistant Examiner* — Huan Le
(74) *Attorney, Agent, or Firm* — Wenderoth, Lind & Ponack, LLP (57) ABSTRACT

An object is to reduce various losses occurring in a speed-reduction/differential gear apparatus for electric vehicles including a planetary-gear speed reducer and a differential device, thereby improving transmission efficiency of the driving force and increasing travel distance of the electric vehicle per battery charge. A speed-reduction/differential gear apparatus for electric vehicles includes a planetary-gear speed reducer and a differential device. A planetary gear mechanism in the speed reducer includes a speed-reducer-side carrier which has its inner diameter surface supported by a speed-reducer-side carrier support bearing. The invention provides proper mesh between in the pair of engaging teeth, leading to decrease in loss torque.

9 Claims, 6 Drawing Sheets

(51) Int. Cl.
  *B60K 17/16* (2006.01)
  *F16H 48/11* (2012.01)

(56) References Cited

FOREIGN PATENT DOCUMENTS

| JP | 62-24157 | 2/1987 |
|---|---|---|
| JP | 5-332407 | 12/1993 |
| JP | 6-323404 | 11/1994 |
| JP | 8-42656 | 2/1996 |
| JP | 11-166609 | 6/1999 |
| JP | 2001-65647 | 3/2001 |
| JP | 2006-298273 | 11/2006 |

OTHER PUBLICATIONS

International Preliminary Report on Patentability and Written Opinion of the International Searching Authority issued Nov. 28, 2013 in International (PCT) Application No. PCT/JP2012/059525.

* cited by examiner

REDUCTION DIFFERENTIAL GEAR APPARATUS FOR ELECTRIC VEHICLE

BACKGROUND OF THE INVENTION

1. Technical Field

The present invention relates to speed-reduction/differential gear apparatuses for motor-driven electric vehicles, and in particular to one which has decreased loss in torque thereby having improved transmission efficiency leading to increased mileage per electric charge.

2. Description of the Related Art

A conventional speed-reduction/differential gear apparatus for electric vehicles is typically constituted by a combination of an electric motor, a planetary-gear speed reducer and a planetary-gear differential device. The speed reducer includes an input shaft which is integral with a motor shaft of the electric motor, and the differential device receives speed-reduced output from the speed reducer, as an input (Patent Literature 1).

In the differential device, an output is differentially distributed to two distribution members, i.e., the sun gear and the carrier. At the center of the sun gear, there is inserted and connected a first output shaft. The first output shaft coaxially penetrates the speed reducer's input shaft and the motor shaft which is integral with the reducer input shaft, connects to a motor-side constant-velocity joint, which is connected one of the driving wheels. On the other hand, the carrier is connected to a second output shaft. The second output shaft is connected to a differential-side constant-velocity joint, which is connected to another driving wheel.

In the above-described speed reducer and differential device, needle roller bearings are generally used for pinion gears which are included in the planetary gear mechanisms, as described in Patent Literature 1 and 2. An example is shown in FIG. 7.

Figure 7:
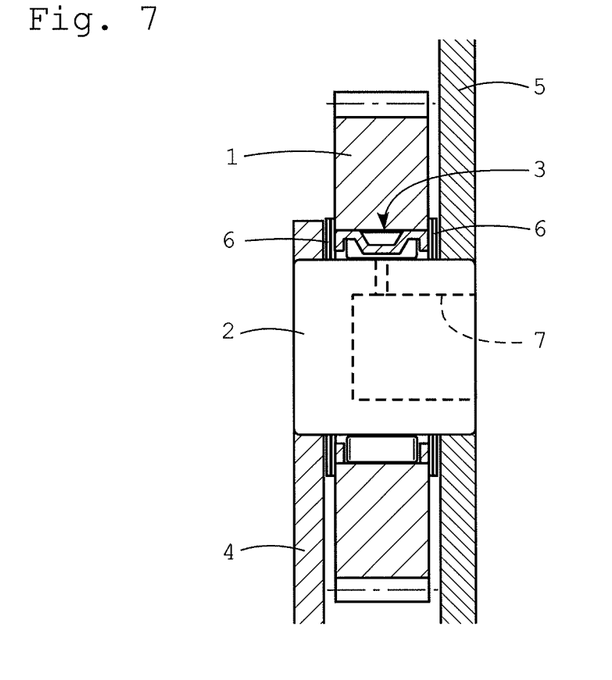
FIG. 7 is an enlarged sectional view of a portion of a conventional speed-reducer-side pinion support structure.

FIG. 7 relates to a support structure for a pinion gear 1 in a speed reducer. A needle roller bearing 3 is placed between the pinion gear 1 and a pinion shaft 2. The pinion shaft 2 has its two ends supported by a carrier 4 and by a disc region 5 of a differential-side ring gear respectively. Thrust washers 6, 6 are placed between an end surface of the pinion gear 1 and the carrier 4, and between another end surface and a disc region 5. Lubrication to the needle roller bearing 3 is performed through an oil hole 7 which is made in the pinion shaft 2.

CITATION LIST

Patent Literature

Patent Literature 1: JP-A H08-42656 Gazette
Patent Literature 2: JP-A H06-323404 Gazette

SUMMARY OF THE INVENTION

1. Technical Problem

According to the Patent Literature 1, the speed reducer's planetary gear mechanism has a carrier support structure in which the speed-reducer-side carrier is only connected to a speed-reducer-side pinion pin. In other words, it is not supported by a casing via a bearing. Although the speed-reducer-side carrier is integral with the differential-side ring gear, the differential-side ring gear is engaged only with a differential-side pinion gear.

Therefore, neither the speed-reducer-side carrier nor the differential-side ring gear is not positively positioned at any specific radial locations, and therefore there can be cases where they make eccentric rotation. This also results in tilt, causing undesirable gear engagement which may lead to excessive wear in teeth surface.

In addition, in the support structure for the pinion gear 1 in the speed reducer shown in FIG. 7, the thrust washers 6, 6 make contact with end surfaces of the retainer of the needle roller bearing 3, end surfaces of the pinion gear 1, the carrier 4, and the disc region 5, resulting in slip loss at these regions of contact.

Therefore, an object of the present invention is to reduce various losses occurring in the apparatus as described above, thereby to improve transmission efficiency of the driving force and to increase travel distance of the electric vehicle per battery charge.

2. Solution to the Problem

In order to achieve the above-stated object, the present invention provides a speed-reduction/differential gear apparatus for electric vehicles, which includes: an electric motor; a planetary-gear speed reducer and a planetary-gear differential device which are disposed coaxially with the motor; a casing which houses the above-mentioned components; and a coaxially disposed first and second output shafts. The first output shaft penetrates a motor shaft of the electric motor, has its two end portions supported by the casing via respective output shaft support bearings. Driving force from the electric motor receives speed reduction by the speed reducer and is outputted to the differential device. The speed-reduced driving force is outputted to two distribution members by the differential device in accordance with a size of load; one of the distribution members is connected with the first output shaft whereas the other of the distribution members is connected with the second output shaft. With the arrangement described above, the speed-reduction/differential gear apparatus for electric vehicles further includes a speed-reducer-side carrier support bearing between a speed-reducer-side carrier which constitutes part of a planetary gear mechanism of the speed reducer, and the casing.

According to the arrangement described above, the speed-reducer-side carrier is positively positioned radially, and is prevented from making eccentric rotation. This provides proper mesh between gear teeth, leading to decrease in loss torque.

Specifically, this can be achieved by the following arrangement; the speed-reducer-side carrier has a boss; the speed-reducer-side carrier support bearing is placed between an outer diameter surface of the boss and the casing; and a motor shaft support bearing is placed between an inner diameter surface of the boss and the motor shaft of the electric motor.

Further, there may be another arrangement; interior space of the casing is divided by a partition wall into an electric motor encasing section and a speed reducer and differential device encasing section; the partition wall has a shaft hole through which the motor shaft is inserted; the boss of the speed-reducer-side carrier is inserted between the shaft hole and the motor shaft; and the carrier support bearing is between an outer diameter surface of the boss and the shaft hole.

Also, where the planetary gear mechanism of the speed reducer includes pinion gears and pinion gear shafts, there may be an arrangement that a deep groove ball bearing is placed between each pair of the speed-reducer-side pinion gear and the speed-reducer-side pinion gear shaft. The arrangement enables to supply lubricant oil from a width surface of the deep groove ball bearing. Thus, it is no longer necessary, unlike in cases where a needle roller bearing is utilized, for supplying lubricant from the pinion shaft. Where oil bath lubrication is employed, the above arrangement makes it possible to lower the height of oil surface, which leads to decreased agitation torque of the lubricant oil.

Another arrangement may be that the speed-reducer-side pinion shaft has one end supported by a speed-reducer-side carrier and another end supported by a disc region of a differential-side ring gear; a side plate is placed between the speed-reducer-side carrier and an end surface of an inner ring of the deep groove ball bearing, and a sideplate is placed between a disc region of the differential-side ring gear and another end surface of the inner ring of the deep groove ball bearing.

The side plates as described above do not make sliding contact with the speed-reducer-side pinion gear or bearing's outer ring. This makes it possible to reduce torque loss caused by the sliding contact.

3. Advantageous Effects of the Invention

As understood from the above, the present invention reduces various losses occurring in the apparatus, and therefore the invention is capable of improving transmission efficiency of the driving force and increasing travel distance of the electric vehicle per battery charge.

Another arrangement is that a speed-reducer-side carrier support bearing is placed between a speed-reducer-side carrier which constitute part of the planetary gear mechanism in the speed reducer, and the casing. This provides positive radial positioning and prevents eccentric rotation of the speed-reducer-side carrier. This provides proper mesh between each gear teeth, leading to decrease in loss torque. Actual measurements of the transmission efficiency revealed improvement by a one percent at a maximum.

DETAILED DESCRIPTION OF THE INVENTION

Hereinafter, embodiments of the present invention will be described based on the attached drawings.

Embodiment 1

Figure 1:
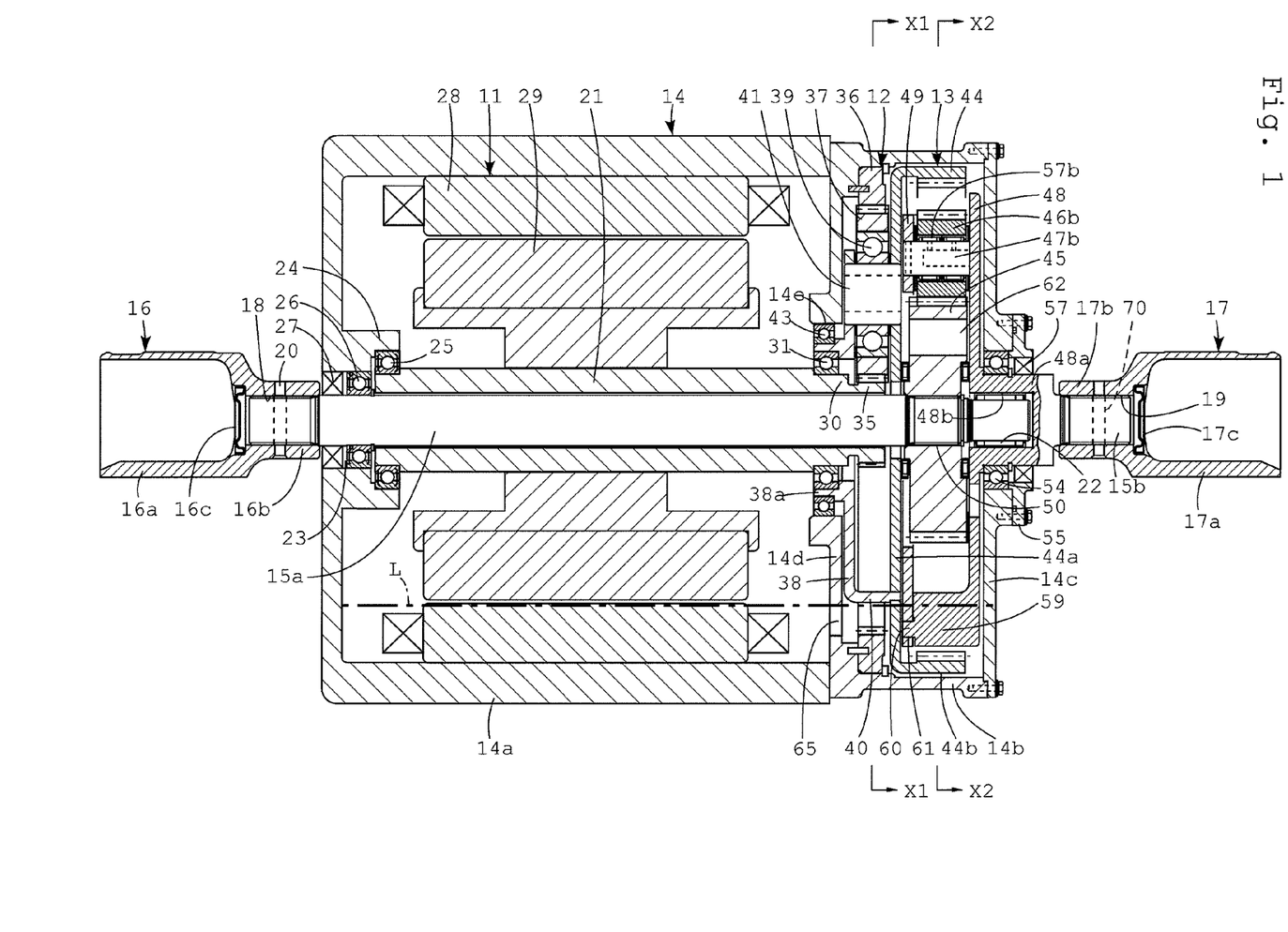
FIG. 1 is a sectional view of Embodiment 1.
Figure 2:
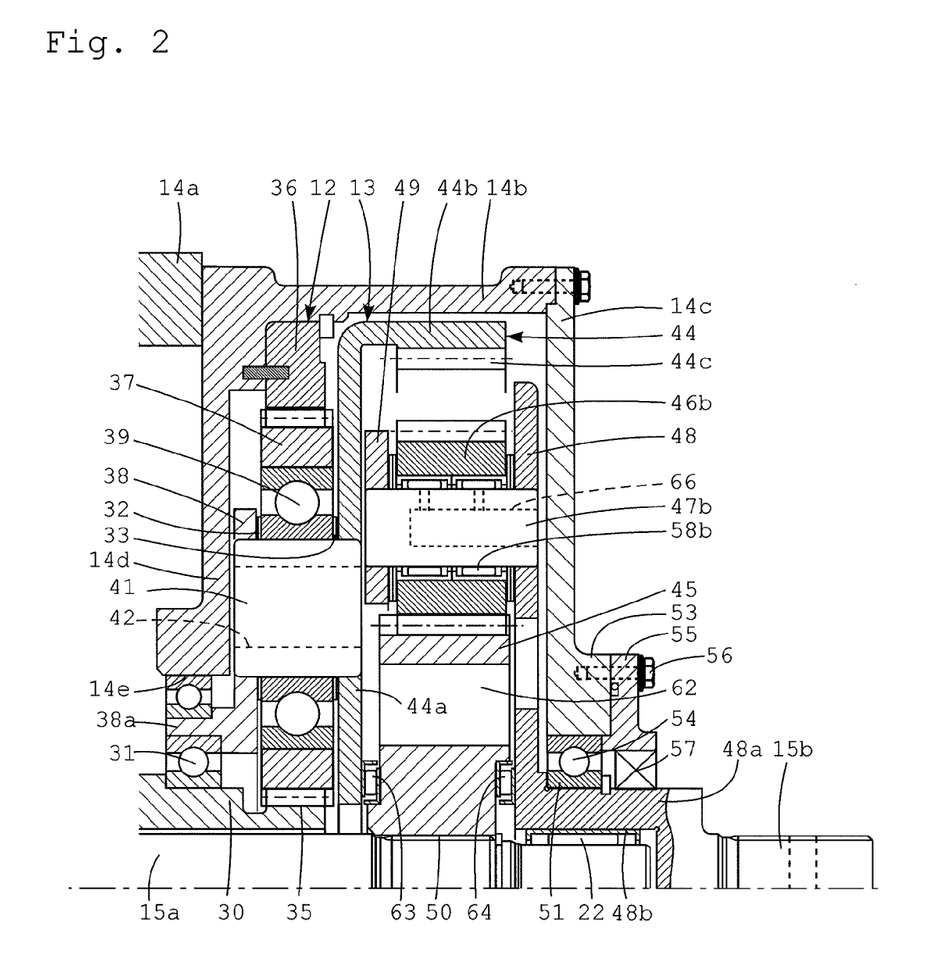
FIG. 2 is an enlarged sectional view of a portion of the same.

A speed-reduction/differential gear apparatus for electric vehicles according to Embodiment 1 includes, as shown in FIG. 1 and FIG. 2, an electric motor 11, a planetary-gear speed reducer 12 and planetary-gear differential device 13 which are disposed coaxially with each other; a casing 14 which houses the above-listed components; and a first output shaft 15a and a second output shaft 15b which are disposed coaxially with each other. The first output shaft 15a is connected to an outer ring 16 (hereinafter called motor-side outer ring 16) of a motor-side constant-velocity joint whereas the second output shaft 15b is connected to an outer ring 17 (hereinafter called differential-side outer ring 17) of a differential-side constant-velocity joint.

The motor-side outer ring 16 and the differential-side outer ring 17 respectively have cups 16a, 17a and stems 16b, 17b. Spaces between the respective pair of cups 16a, 17a and the stems 16b, 17b are partitioned by cup bottom plates 16c, 17c. The stem 16b and the stem 17b have axially penetrating serrated holes 18, 19 respectively.

The first output shaft 15a penetrates a hollow motor shaft 21 of the electric motor 11. The first output shaft 15a has an end on the electric motor 11 side, which is inserted into the serrated hole 18 in the stem 16b of the motor-side outer ring 16, thereby integrally connected therewith by serration connection. Further, at the end portion of the stem 16b where the first output shaft 15a is inserted, an anti-backoff pin 20 is inserted radially to prevent the first output shaft 15a from backing off.

Also, the first output shaft 15a has an end on the differential device 13 side, which is inserted into a bearing hole 48b made in a boss 48a in a differential-side carrier 48 to be described later (see FIG. 2). Between an inserting end of the second output shaft 15b and an inner diameter surface of the bearing hole 48b, there is disposed an output shaft support bearing 22 which is provided by a needle roller bearing.

The casing 14 is an assembly of a motor casing 14a which houses the electric motor 11; a speed-reduction/differential casing 14b which houses the speed reducer 12 and the differential device 13; and a casing lid 14c on the differential device 13 side.

Each of the motor casing 14a and the speed-reduction/differential casing 14b has their one end closed and another end open. The closed end of the speed-reduction/differential casing 14b is coaxially and sealingly fitted and connected to the open end of the motor casing 14a whereas the casing lid 14c is sealingly fitted and connected to the open end of the speed-reduction/differential casing 14b.

The closed end of the speed-reduction/differential casing 14b serves as a partitioning wall 14d which divides an interior space of the casing 14; i.e. the partitioning wall 14d divides the space into an encasing section for the electric motor 11, and an encasing section for the speed reducer 12 and the differential device 13. The partitioning wall 14d has a center with a bearing hole 14e.

The closed end (left end) of the motor casing 14a has a center with a shaft hole 23. Inside the shaft hole 23, there is provided an axially protruding boss 24. The motor shaft 21 has its end inserted into an inner end's inner diameter surface of the boss 24, via a motor shaft support bearing 25, which is provided by a deep-groove ball bearing, disposed between the two members.

At the motor shaft support bearing 25, the first output shaft 15a comes out of the end of the motor shaft 21 to protrude to the outside of the motor casing 14a, and to this protrusion the stem 16b of the motor-side outer ring 16 is connected. Also, between an inner diameter surface of the boss 24 and the first output shaft 15a, there is placed a first output shaft support bearing 26, and on an outer side thereof, an oil seal 27 is provided. The oil seal 27 provides sealing against lubricant oil inside the motor casing 14a.

The electric motor 11 housed in the motor casing 14a is constituted by a stator 28 which is fixed to an inner circumferential surface of the motor casing 14a, and a rotor 29 which is inside the stator and is assembled integrally with the motor shaft 21. The motor shaft 21 has its one end supported by the motor shaft support bearing 25.

The motor shaft 21 has another end supported by a motor shaft support bearing 31 which is provided by a deep groove ball bearing placed between the shaft and the partitioning wall 14d, i.e., the closed wall of the speed-reduction/differential casing 14b. From this motor shaft support bearing 31, an end of the motor shaft 21 protrudes toward the speed reducer 12, serving as a speed reducer input shaft 30.

The speed-reduction/differential casing 14b coaxially houses the speed reducer 12 and the differential device 13 in this order from the partitioning wall 14d side.

The speed reducer 12 is constituted by a speed-reducer-side sun gear 35 (see FIG. 2 and FIG. 3) which is provided integrally with the speed reducer input shaft 30 around an outer circumferential surface of a tip-end of the shaft; a speed-reducer-side ring gear 36 which is on the outer diameter side of the sun gear and is coaxially fixed to an inner diameter surface of the speed-reduction/differential casing 14b; and speed-reducer-side pinion gears 37 and a speed-reducer-side carrier 38 (see FIG. 1 and FIG. 2) which are disposed between the sun gear 35 and the ring gear 36, along the circumferential direction at three equidistant locations.

Figure 3:
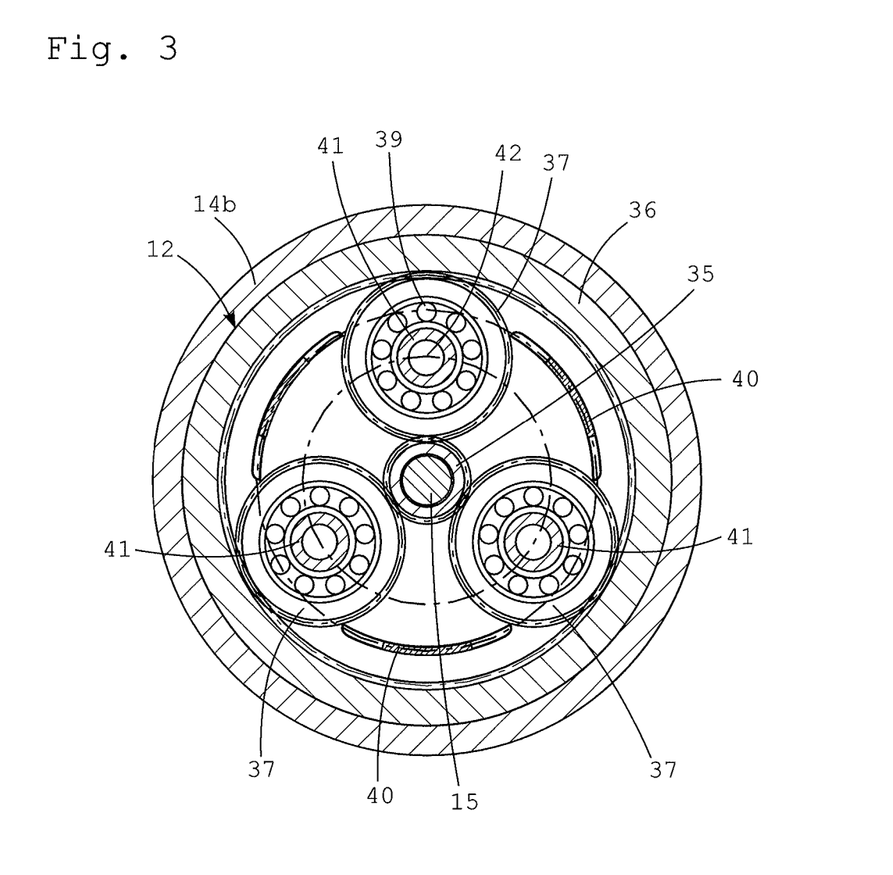
FIG. 3 is a sectional view taken in lines X1-X1 in FIG. 1.

The speed-reducer-side pinion gears 37 engage with the sun gear 35 and the ring gear 36. Also, each pinion gear 37 is supported by the speed-reducer-side pinion shaft 41 via a deep groove ball bearing 39. The pinion shaft 41 has an axially penetrating lubrication hole 42.

As shown in FIG. 2, the speed-reducer-side pinion shaft 41 has its one end supported by the speed-reducer-side carrier 38, and another end supported by a disc region 44a of a differential-side ring gear 44 which will be described later. Side plates 32, 33 are placed, i.e., one between the speed-reducer-side carrier 38 and an end surface of an inner ring 39a (see FIG. 4) of the deep groove ball bearing 39, and the other between the other end surface of the inner ring and the disc region 44a of the differential-side ring gear 44 (see FIG. 4).

Figure 4:
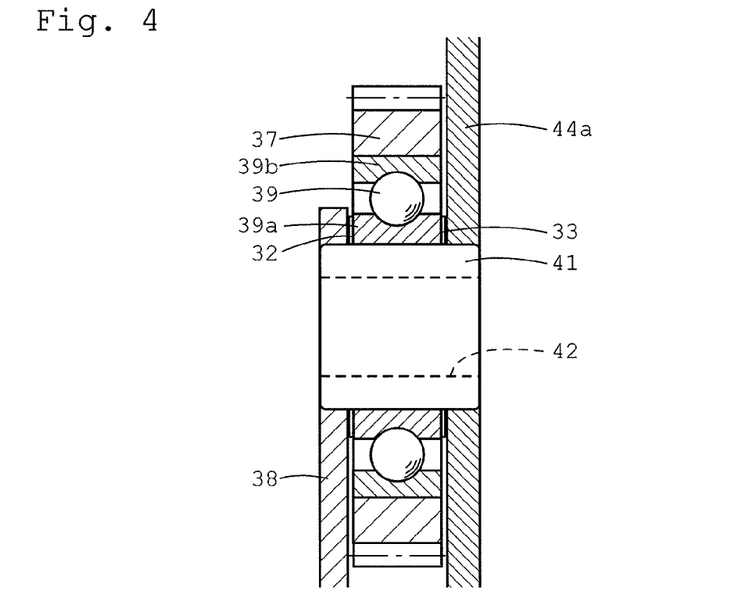
FIG. 4 is an enlarged sectional view of a portion of a speed-reducer-side pinion support structure in Embodiment 1.

These side plates 32, 33 have an outer diameter which is smaller than that of the inner ring 39a, so as to avoid contact with an outer ring 39b or with the pinion gear 37. Also, none of the inner ring 39a, the speed-reducer-side carrier 38 and the differential-side ring gear 44 makes relative rotation with respect to the side plates 32, 33, so there is no slip loss at the side plates 32, 33.

Figure 5:
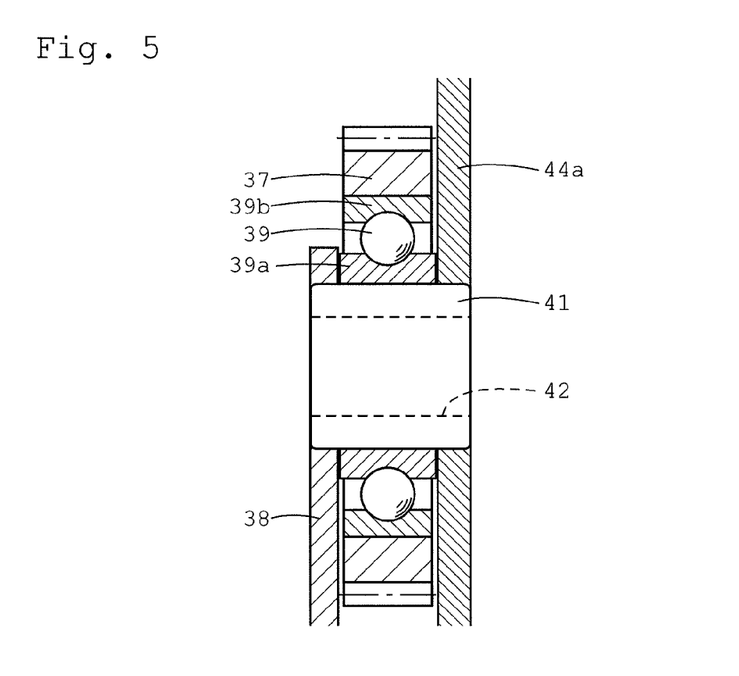
FIG. 5 is a sectional view of a portion of a variation made to the arrangement shown in FIG. 4.

If the side plates 32, 33 are not employed, then slip loss may be avoided by a different arrangement. Specifically, as shown in FIG. 5, the inner ring 39a is given a greater width than that of the speed-reducer-side pinion gear 37 so as to avoid contact between the speed-reducer-side carrier 38 and the disc region 44a of the differential-side ring gear 44.

As shown in FIG. 2, the speed-reducer-side carrier 38 is fitted between the partitioning wall 14d, which represents the closed end of the speed-reduction/differential casing 14b, and the speed-reducer-side pinion gear 37, with a radial gap around the speed reducer input shaft 30. In its inner diameter section, the speed-reducer-side carrier 38 has a boss 38a protruding toward the electric motor 11, and this boss 38a is inserted between the speed reducer input shaft 30 which is integral with the motor shaft 21, and the bearing hole 14e of the partitioning wall 14d.

A carrier support bearing 43 which is provided by a deep groove ball bearing is disposed between an outer diameter surface of the boss 38a and the bearing hole 14e. Also, the motor shaft support bearing 31 is disposed between an inner diameter surface of the boss 38a and the speed reducer input shaft 30. The carrier support bearing 43 positions the speed-reducer-side carrier 38 with respect to the casing 14. Also, the motor shaft support bearing 31 positions the motor shaft 21 with respect to the casing 14 via the carrier support bearing 43.

The speed-reducer-side carrier 38 has an outer circumferential edge, which has a plurality of connection tabs 40 (see FIG. 1 and FIG. 3) each bent toward the differential device 13, at a space along its circumferential direction. These connection tabs 40 are inserted into the ring gear disc region 44a of the differential-side ring gear 44, to fasten the speed-reducer-side carrier 38 and the differential-side ring gear 44 with each other.

Figure 6:
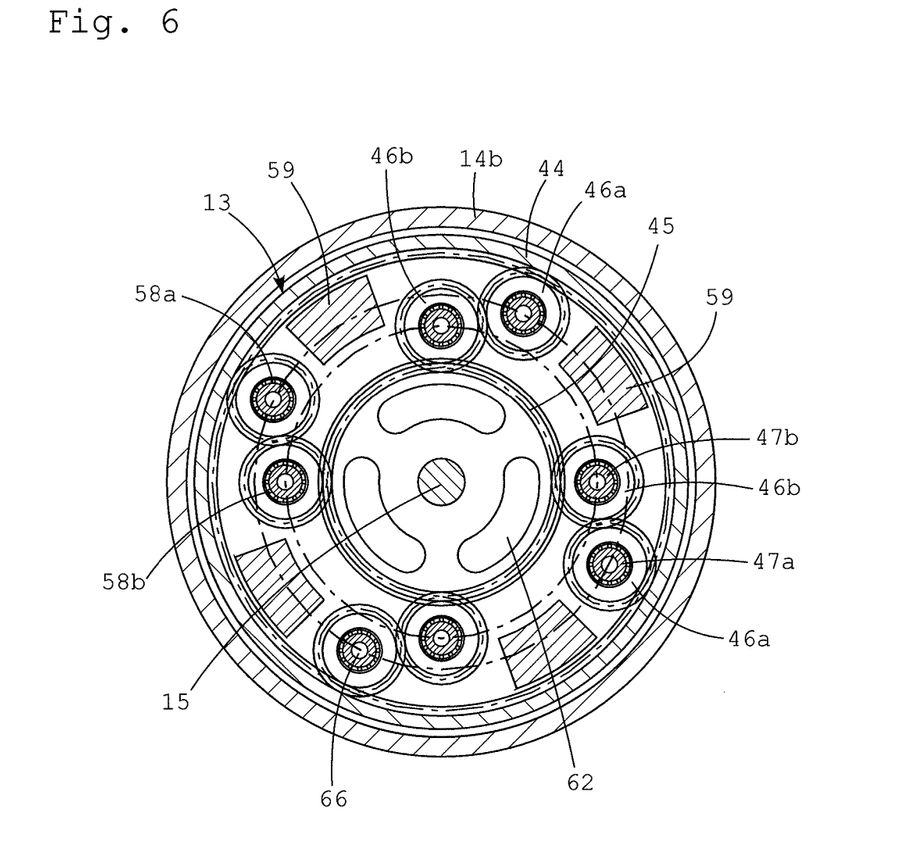
FIG. 6 is a sectional view taken in lines X2-X2 in FIG. 1.

As shown in FIG. 1, FIG. 2 and FIG. 6, the differential device 13 is constituted by: the differential-side ring gear 44; a differential-side sun gear 45 which is radially inside thereof and is coaxially therewith; double-pinion differential-side pinion gears 46a, 46b engaged with each other and disposed between the ring gear 44 and the sun gear 45; differential-side pinion shafts 47, 47b which support these pinion gears 46a, 46b; and a differential-side carrier 48 which supports these pinion shafts 47a, 47b.

The differential-side ring gear 44 includes a disc region 44a; a circumferential region 44b which is an outer circumferential edge of the disc region 44a bent outward (toward the casing lid 14c); and a gear region 44c formed on an inner diameter surface of the circumferential region 44b. The disc region 44a is fittingly disposed coaxially around an outer circumference of the first output shaft 15a, with a radial gap (see FIG. 2). A thrust bearing 63 is disposed between the disc region 44a and the differential-side sun gear 45.

The differential-side sun gear 45 has a serrated hole 50 in its center, into which the first output shaft 15a is inserted, thereby integrated with the first output shaft 15a by means of serration connection.

An end of the first output shaft 15a which protrudes outward from the serration connection is inserted into the bearing hole 48b in the boss 48a of the differential-side carrier 48. Between this inserting region and an inner diameter surface of the bearing hole 48b, there is disposed a first output shaft support bearing 22 which is provided by a needle roller bearing. The boss 48a is supported by the casing 14 which includes the casing lid 14c, via a differential-side carrier support bearing 54 to be described later. The differential-side sun gear 45 has an axial lubrication hole 62.

The double-pinion gears 46a, 46b have the same size and the same number of teeth as each other. As shown in FIG. 6, they engage with each other. One pinion gear 46a of the two has a greater PCD than the other pinion gear 46b, and engages with the ring gear 44 whereas the other pinion gear 46b which has a smaller PCD engages with the sun gear 45. Needle roller bearings 58a, 58b are disposed between each pair made by the pinion gears 46a, 46b and the pinion shafts 47a, 47b. Each of the pinion shafts 47a, 47b has an oil hole 66.

As shown in FIG. 2, the differential-side carrier 48 is disposed along an inner side surface of the casing lid 14c and provides support, together with a differential-side carrier assist member 49 which is disposed along the disc region 44a of the differential-side ring gear 44, to two ends of both pinion shafts 47a, 47b. The differential-side carrier 48 includes an outer circumferential edge which has a plurality of locations each having a fastening protrusion 59 (see FIG. 1 and FIG. 6) protruding toward the differential-side carrier assist member 49. Each of the fastening protrusions 59 has a tip formed with a small projection 60 (see FIG. 1), which is inserted into a fastening hole 61 in the differential-side carrier assist member 49. This fastens the differential-side carrier 48 and the differential-side carrier assist member 49 with each other.

As shown in FIG. 1 and FIG. 2, the boss 48a is at a center of the differential-side carrier 48, protruding outward. The axial bearing hole 48b in the boss 48a is at an inner end (at the end of the differential device 13 side), and as has been described earlier, the end of the first output shaft 15a is inserted into the bearing hole 48b, in a rotatable manner via the first output shaft support bearing 22.

The boss 48a has a closed outer end, at a center of which there is integrally provided the second output shaft 15b which was described earlier. The second output shaft 15b is inserted into the serrated hole 19 in the stem 17b of the differential-side outer ring 17, and therefore fastened with the stem by means of serration connection. Also, in the stem 17b, an anti-backoff pin 70 penetrates the second output shaft 15b radially, to prevent the shaft from backing off.

A differential-side carrier support bearing 54 which is provided by a deep groove ball bearing is placed between the boss 48a in the differential-side carrier 48 and a boss 53 in the casing lid 14c, so that the differential-side carrier 48 and the second output shaft 15b are supported by the casing 14 including the casing lid 14c.

The differential-side carrier support bearing 54 has a holding ring 55 which is fastened by a bolt 56 to an outer side surface of the boss 53 of the casing lid 14c. An oil seal 57 is placed between the holding ring 55 and the boss 48a, sealing the speed-reduction/differential casing 14b, thereby keeping lubrication oil inside.

The speed-reduction/differential gear apparatus for electric vehicles according to Embodiment 1 has the arrangement as described thus far. Next, description will cover functions thereof.

As the electric motor 11 (see FIG. 1) is driven, the motor shaft 21 rotates. Simultaneously, the speed reducer input shaft 30 and the speed-reducer-side sun gear 35, which are integral with the motor shaft 21, rotate. The speed-reducer-side pinion gears 37 which are engaged with the speed-reducer-side sun gear 35, rotates while revolving. This revolving movement causes the speed-reducer-side carrier 38 to make rotation at a reduced speed, and this slower rotation is outputted to the differential-side ring gear 44 on the differential device 13 side.

Where the number of teeth in the speed-reducer-side sun gear 35 is represented by Zs and the number of teeth in the speed-reducer-side ring gear 36 is represented by Zr, the speed reduction is made at a ratio of $Zs/(Zs+Zr)$ as is well known.

A load received by one of the wheels of the vehicle is applied to the differential-side sun gear 45 via the motor-side constant-velocity joint which includes the motor-side outer ring 16 and the first output shaft 15a whereas a load received by the other wheel is applied to the differential-side carrier 48 via the differential-side constant-velocity joint which includes the differential-side outer ring 17 and the second output shaft 15b. When the loads applied to the two wheels are equal to each other, the differential-side sun gear 45, the pinion gears 46a, 46b and the carrier 48 rotate in an integral fashion, i.e., there is no relative rotation amongst them in response to the rotational input from the ring gear 44. Thus, the rotational input is distributed evenly, i.e., a portion thereof is passed on the differential-side sun gear 45 and the first output shaft 15a, to the motor-side outer ring 16 while another portion is passed on the differential-side carrier 48 and the second output shaft 15b, to the differential-side outer ring 17, causing the left and the right wheels to turn at the same speed via their respective constant-velocity joints.

On the other hand, when there is a difference between the loads which are applied to the left and the right wheels, the rotational input resulting from rotation and revolution of the pinion gears 46a, 46b is differentially distributed to the left and the right wheels through the above-mentioned routes, and then through the motor-side outer ring 16 or through the differential-side outer ring 17, in accordance with a load difference.

In other words, in a case where the load which is passed on to the motor-side outer ring 16 and is applied to the first output shaft 15a becomes relatively larger, causing the sun gear 45 which is integral with the shaft to rotate at a number of rotations Ns and this number is smaller than a number of input rotations Nr of the ring gear 44 by $\Delta N$, the carrier 48 rotates at a number of rotations Nc, which is expressed as:

$$Nc = Nr + \lambda/(1-\lambda) \cdot \Delta N$$

In other words, the second output shaft 15b rotates at a higher speed. In the above equation, $\lambda$ represents gear ratio ($=Zs/Zr$) whereas Zs represents the number of teeth in the sun gear 45, and Zr represents the number of teeth in the ring gear 44.

On the other hand, in a case where the load which is passed on to the differential-side outer ring 17 and is applied to the second output shaft 15b becomes relatively larger, causing the carrier 48 which is integral with the shaft to rotate at a number of rotations Nc and this number is smaller than the number of input rotations Nr by $\Delta N$, the sun gear 45 rotates at the number of rotations Ns which is expressed as:

$$Ns = Nr + (1-\lambda)/\lambda \cdot \Delta N$$

In other words, the first output shaft 15a rotates at a higher speed.

During these operations, the speed-reducer-side carrier 38 and the differential-side ring gear 44 which is integrally fastened thereto make their rotations under a positively positioned state, being supported by the casing 14 via the speed-reducer-side carrier support bearing 43. The arrangement, therefore, prevents each gear in each planetary gear mechanism in the speed reducer 12 and the differential device 13 from making eccentric rotation.

Also, the speed-reducer-side pinion gears 37 and their support bearings, i.e., the deep groove ball bearings 39 are prevented from making slip loss which may otherwise caused by the side plates 32, 33.

The speed-reduction/differential gear apparatus for electric vehicles according to Embodiment 1 utilizes oil-bath lubrication. Specifically, lubrication oil for both of the motor casing 14a and the speed-reduction/differential casing 14b fills inside the casing 14 to the level indicated by an oil surface level symbol L. The stator 28 of the electric motor 11 is below the oil surface L but the rotor 29 is not. In this arrangement, rotation of the rotor 29 will not agitate the lubricant oil, so the arrangement decreases loss caused by the agitation.

In the speed reducer 12, the speed-reducer-side carrier 38 has the connection tabs 40 and the speed-reducer-side pinion gear 37 on its outer circumference, and they splash the lubricant oil during their rotation as they pass through the body of lubricant oil below the oil surface L. The lubricant oil is splashed inside the speed reducer 12 and lubricates the parts inside. Part of the oil finds a way to a lubrication hole 42 in the speed-reducer-side pinion shaft 41 and moves axially.

Since the speed-reducer-side pinion gear 37 is supported by the deep groove ball bearing 39, splashed lubrication oil is supplied from the width surface of the deep groove ball bearing 39. For this reason, there is no need for an arrangement to provide lubrication from inside the speed-reducer-side pinion shaft 41.

In the differential device 13, the differential-side carrier 48 has the fastening protrusions 59, the differential-side pinion gears 46*a*, 46*b*, etc., on its outer circumference, and they splash lubrication oil. The lubricant oil is splashed inside the differential device 13 and lubricates the parts inside. Part of the oil finds a way to a lubrication hole 62 made in the differential-side sun gear 45 and moves axially.

During the above-described operation, the oil seals 27, 57 on both of the left and right sides prevent the lubrication oil from leaking out of the casing 14. Also, lubricant oil which reached the motor casing 14*a* and the speed-reduction/differential casing 14*b* communicate with each other inside the casing 14 through a communication hole 65 in the closed wall of the speed-reduction/differential casing 14*b*.

REFERENCE SIGNS LIST 11 electric motor
12 speed reducer
13 differential device
14 casing
14*a* motor casing
14*b* speed-reduction/differential casing
14*c* casing lid
14*d* partitioning wall
14*e* bearing hole
15*a* first output shaft
15*b* second output shaft
16 motor-side outer ring
16*a* cup
16*b* stem
16*c* cup bottom plate
17 differential-side outer ring
17*a* cup
17*b* stem
17*c* cup bottom plate
18 serrated hole
19 serrated hole
20 anti-backoff pin
21 motor shaft
22 first output shaft support bearing
23 shaft hole
24 boss
25 motor shaft support bearing
26 first output shaft support bearing
27 oil seal
28 stator
29 rotor
30 speed reducer input shaft
31 motor shaft support bearing
32 side plate
33 side plate
35 speed-reducer-side sun gear
36 speed-reducer-side ring gear
37 speed-reducer-side pinion gear
38 speed-reducer-side carrier
38*a* boss
39 deep groove ball bearing
39*a* inner ring
39*b* outer ring
40 connection tab
41 speed-reducer-side pinion shaft
42 lubrication hole
43 speed-reducer-side carrier support bearing
44 differential-side ring gear
44*a* disc region
44*b* circumferential region
44*c* gear region
45 differential-side sun gear
46*a*, 46*b* differential-side pinion gear
47*a*, 47*b* differential-side pinion shaft
48 differential-side carrier
48*a* boss
48*b* bearing hole
49 differential-side carrier assist member
50 serrated hole
52 serration-connected region
53 boss
54 differential-side carrier support bearing
55 holding ring
56 bolt
57 oil seal
58*a*, 58*b* needle roller bearing
59 fastening protrusion
60 small projection
61 fastening hole
62 lubrication hole
63 thrust bearing
65 communication hole
66 oil hole
70 anti-backoff pin

The invention claimed is:

1. A speed-reduction/differential gear apparatus for electric vehicles, comprising:
    an electric motor;
    a planetary-gear speed reducer and a planetary-gear differential device which are disposed coaxially with the motor;
    a casing housing the electric motor, the planetary-gear speed reducer, and the planetary-gear differential device;
    a first output shaft penetrating a motor shaft of the electric motor, the first output shaft having two end portions supported by the casing via respective output shaft support bearings; and
    a second output shaft disposed coaxially with respect to the first output shaft,
    driving force from the electric motor receiving speed reduction by the speed reducer and being outputted to the differential device;
    the speed-reduced driving force being outputted to two distribution members by the differential device in accordance with a size of load; one of the distribution members being connected with the first output shaft whereas the other one of the distribution members being connected with the second output shaft;
    wherein the speed-reduction/differential gear apparatus for electric vehicles further comprises a speed-reducer-side carrier support bearing disposed between a speed-reducer-side carrier, which constitutes part of a planetary gear mechanism of the speed reducer, and the casing,
    wherein the speed-reducer-side carrier has a boss, the speed-reducer-side carrier support bearing is disposed between an outer diameter surface of the boss and the casing, and a motor shaft support bearing is placed between an inner diameter surface of the boss and the motor shaft of the electric motor.

2. The speed-reduction/differential gear apparatus for electric vehicles according to claim 1, wherein interior space of the casing is divided by a partition wall into an electric motor encasing section and a speed reducer and differential device encasing section; the partition wall has a shaft hole through which the motor shaft is inserted; the boss of the speed-reducer-side carrier is inserted between the shaft hole and the motor shaft; and the carrier support bearing is disposed between the outer diameter surface of the boss and the shaft hole.

3. The speed-reduction/differential gear apparatus for electric vehicles according to claim 1, wherein the speed reducer and differential device are lubricated by oil bath lubrication.

4. The speed-reduction/differential gear apparatus for electric vehicles according to claim 1, wherein the planetary gear mechanism of the differential device includes a differential-side carrier which has a boss; the boss has its inside surface formed with an axial bearing hole while having an outer surface integrally formed with the second output shaft; and a differential-side carrier support bearing is disposed between the outer diameter surface of the boss and the casing.

5. The speed-reduction/differential gear apparatus for electric vehicles according to claim 4, wherein the first output shaft has its one end portion inserted into the axial bearing hole in the differential-side carrier; and a first output shaft support bearing is disposed between the inserted end portion and an inner diameter surface of the bearing hole.

6. The speed-reduction/differential gear apparatus for electric vehicles according to claim 1, wherein the planetary gear mechanism of the speed reducer includes speed-reducer-side pinion gears and speed-reducer-side pinion shafts, and a deep groove ball bearing is placed between each pair of the speed-reducer-side pinion gear and the speed-reducer-side pinion gear shaft.

7. The speed-reduction/differential gear apparatus for electric vehicles according to claim 6, wherein each of the speed-reducer-side pinion shafts has one end supported by the speed-reducer side carrier and another end supported by a disc region of a differential-side ring gear; a side plate is placed between the speed-reducer-side carrier and an end surface of an inner ring of the deep groove ball bearing, and a side plate is placed between a disc region of the differential-side ring gear and another end surface of the inner ring of the deep groove ball bearing.

8. The speed-reduction/differential gear apparatus for electric vehicles according to claim 7, wherein the side plates have an outer diameter which is smaller than that of the inner ring in the deep groove ball bearing.

9. The speed-reduction/differential gear apparatus for electric vehicles according to claim 7, wherein the inner ring of the deep groove ball bearing has a width which is wider than that of the speed-reducer-side pinion gear.

* * * * *